UNITED STATES PATENT OFFICE.

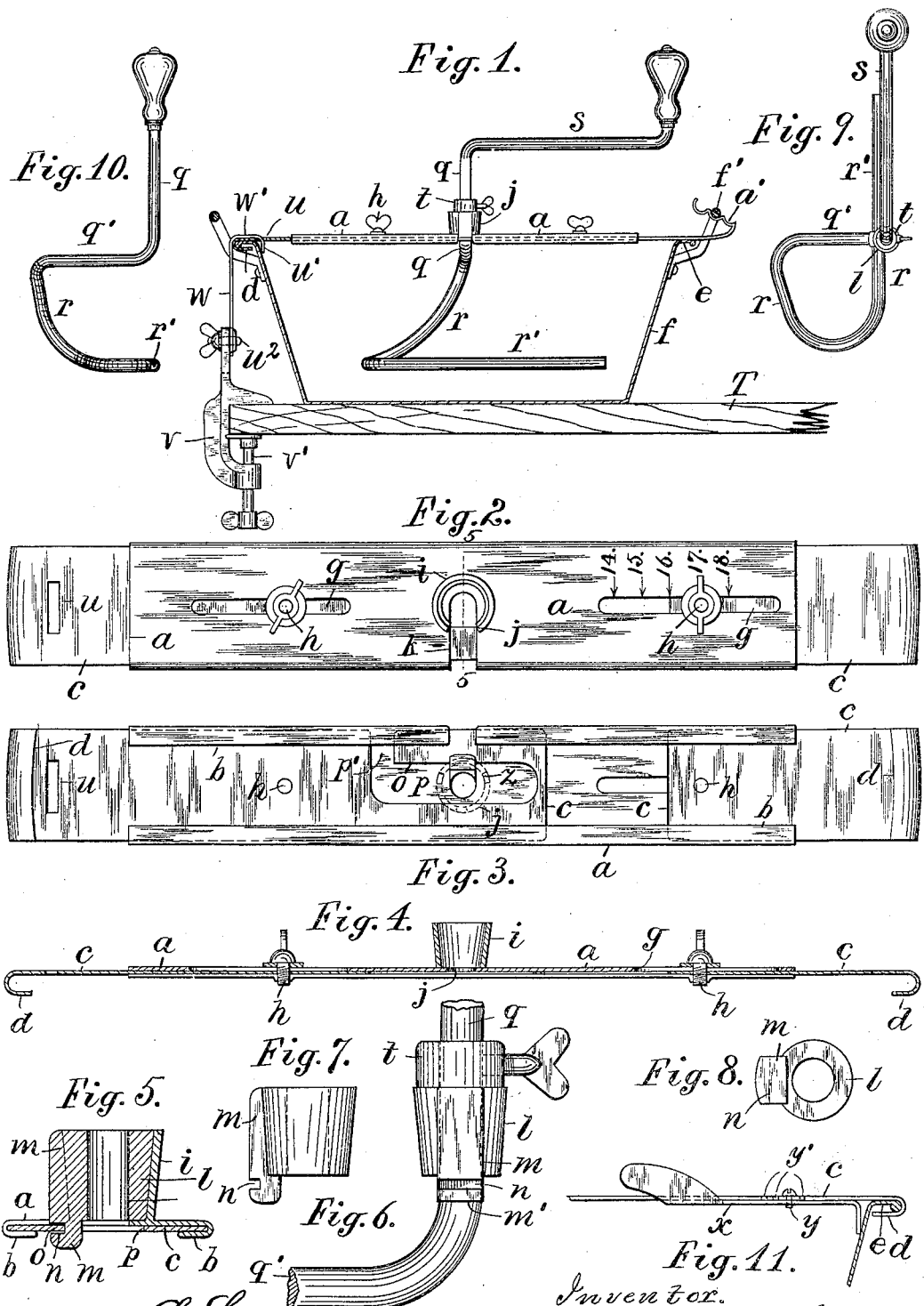

FREDERIC BARR, OF BROOKLYN, NEW YORK.

BREAD-MIXER.

No. 805,050.  Specification of Letters Patent.  Patented Nov. 21, 1905.

Application filed November 16, 1904. Serial No. 232,909.

*To all whom it may concern:*

Be it known that I, FREDERIC BARR, a citizen of the United States, residing at 255 Eighth street, Brooklyn, county of Kings, State of New York, have invented certain new and useful Improvements in Bread-Mixers, fully described and represented in the following specification and the accompanying drawings, forming a part of the same.

The object of the present invention is to furnish a bearing-bar for a dough-mixing stirrer, which bar and its attachments may be formed of sheet metal and adapted to fit upon or engage the edge or handle of mixing-pans of various diameters and to furnish a construction in which all the parts may be readily separated to facilitate the cleansing of the same after they have been used.

The invention embraces a bearing-bar having both ends adjustable to fit mixing-pans of various diameters, means applied to the ends of the bar for engaging them with the handle or edge of the bread-pan, a socket of particular construction upon the bearing-bar with a bearing secured detachably in the socket to support the spindle of the stirrer, and a stirrer-spindle adjustable vertically in the bearing to suit pans of various depths and provided with a clamp-collar for supporting it in its adjusted position.

The details of construction will be understood by reference to the annexed drawings, in which—

Figure 1 is an elevation of the apparatus with the mixing-pan in section. Fig. 2 shows the upper side of the bearing-bar; Fig. 3, the under side of the same; Fig. 4, a longitudinal section of the same. Fig. 5 is a cross-section on line 5 5 in Fig. 2. Fig. 6 is an elevation of the socket; Fig. 7, a side view of the same, and Fig. 8 a view of its bottom end. Fig. 9 is a plan of the stirrer and its hand-crank, and Fig. 10 an elevation of the same at right angles to the view shown in Fig. 1. Fig. 11 shows a lever for locking the slide upon the flange of the pan.

The body $a$ of the bearing-bar is shown formed of sheet metal with inwardly-turned flanges $b$ upon its edges and slides $c$, of sheet metal, fitted within such flanges and provided at the ends with hooks $d$ to embrace the edges $e$ of the mixing-pan $f$.

Both ends of the body $a$ are provided with adjustable slides, so that the bearing-bar may be adapted to fit pans of different diameters and retain the bearing in the center.

The body $a$ is provided with slots $g$, and screws $h$ are inserted through the slots into the slides to adjust them upon the body. An inwardly-tapering or conical socket $i$ is shown fixed upon the center of the body $a$ and formed with notch $j$ in one side, and a notch $k$ is extended from the notch $j$ outward to the edge of the body $a$. The bearing $l$ is of tapering form to fit tightly in the socket and is provided with a rib $m$ at one side to fit the notch $j$. A lug $m'$ extends downward from the rib $m$ through the bearing-bar and is provided with a notch $n$ upon its outer side to receive a tongue $o$, formed upon one of the slides to lock the bearing in the socket when the slide is suitably adjusted for use upon the pan. The tongue forms a lock to lock the bearing in the socket. The tongue is formed at one side of a slot $p$ in the slide, having a notch $p'$ extended to the edge of the slide, which coincides with the notch $k$ in the body $a$ when the slide is pushed inwardly with the screw $h$ at the inner end of the slot $g$.

For regulating the adjustment of the slides to bring the bearing in the center of the mixing-pan a scale is formed at the side of the slot $g$ upon the body $a$ to coincide with the inner end of the adjacent slide when properly adjusted.

The device as illustrated is adapted for use with pans from fourteen to eighteen inches diameter, and five marks are shown upon the scale, (marked 14 15 16 17 18,) which indicate the adjustment of the inner end of the slide for pans of such size. Only one of the slides needs to have the scale applied to it, as this slide operates to set the bearing in the center of the pan, corresponding to the number marked upon the scale, and the opposite slide can be set in and out for the purpose of securing the bearing-bar upon the pan and removing it therefrom.

Where the stirrer is used habitually with the same bread-pan, it is obvious that the slide governed by the scale can be secured permanently in the proper position for use with such pan, and only the opposite slide needs to be moved at all in applying the bearing-bar to the pan. Such a clamping of one slide is indicated by the provision of the scale, which shows the proper adjustment of one slide for continued use with one pan. The scale thus operates to bring the bearing automatically to the center of the pan without adjusting both of the slides and without any trial or measurement, while the provision of slides at both ends of the bearing-bar adapts it for use with pans varying widely in size.

The stirrer is formed with a spindle $q$, having a lateral offset $q'$, from which an arm $r$ is curved downward to a reflexed prong $r'$, which extends under the hand-crank $s$ upon the upper end of the spindle. The prong $r'$ extends parallel with the bottom of the pan $f$ and can be adjusted at a suitable distance above the same by a set-screw collar $t$, which rests above the top of the bearing $l$. The hand-crank, the spindle, and the stirrer are made of one piece of round bar-steel, and the bearing $l$ is placed upon the spindle, with the collar $t$, before the hand-crank is bent, and thus lies between the hand-crank and the offset $q'$.

When the slots $p'$ and $k$ are coincident, the shank of the spindle above the offset $q'$ can be slipped sidewise through the slots into the center of the socket and the bearing then dropped into the socket and locked therein by the tongue $o$. Such locking is effected when the slide is pulled outward, which is necessary to fit even the smallest-size mixing-pan, (about fourteen inches diameter,) and the bearing can be detached from the socket to facilitate the cleansing of all the parts after use by pushing the slide inward again.

In Fig. 1 the slide at the right-hand end of the bearing-bar is shown with its end bent backwardly and formed with three transverse grooves or steps $a'$, which are adapted, respectively, to fit beneath the handles $f''$ upon pans of different sizes. The slide is made of sheet metal, and the transversely-grooved portion of the slide is of elastic character, owing to its reflexed position upon the end of the slide, and it can therefore be inserted beneath the handle and pried up against the same to hold the slide firmly.

The slide at the opposite end of the bearing-bar is provided with an inwardly-turned hook $e$, which fits beneath the flange $d$ of the pan at the opposite side, and a hole $u$ is formed in the slide adjacent to the hook to receive a stud $u'$ upon a bracket-clamp $v$, which draws that edge of the pan downwardly upon its supporting-table T.

The stud $u'$ is formed upon a vertical standard $w$, which is adjustable by means of a screw $u^2$ upon the slotted post of the bracket-clamp $v$, and the stud is projected downwardly from an arm $w'$ upon the top end of the standard. The standard is so adjusted upon the bracket-clamp that when the screw $v'$ of the clamp is tightened the arm $w'$ may press upon the upper side of the bearing-bar and clamp the pan firmly upon the table, while the stud passing through the hole $u$ contacts with the inner wall of the pan to hold it securely in place.

Instead of forming one of the slides with the steps $a'$ to engage the pan-handle, both slides may be formed with the hooks $d$, and when the slots are pressed inwardly to engage the flange $e$ they may be held in such engagement by a lug having lever pivoted upon the under side of the bar to press upon the inner wall of the pan. Such a lug is shown in Fig. 11 with a lever $x$ pivoted upon the slide $c$ by a detachable screw $y$, the lug pressing against the inner wall of the pan when the lever is turned lengthwise of the slide, as shown in Fig. 11. A series of holes $y'$ permit the lug to be adjusted upon the slide.

The socket $i$ is, like the body $a$, formed of sheet metal stamped into the desired form and provided upon the lower end with three studs $z$, (shown in Fig. 3,) fitted to holes in the bearing-bar in which they are riveted flush with the under side of the bar to hold the socket thereon, as shown in Figs. 4 and 5. The only parts not formed of sheet metal are the bearing $l$ and the bracket-clamp $v$ and the stirrer, which is formed from a straight round bar. The whole construction is made readily and cheaply by the aid of suitable tools and furnishes a durable and convenient form of dough-mixing device, in which the mixing parts can be readily separated from one another, so as to cleanse them thoroughly after using.

It will be observed by reference to Figs. 1, 9, and 10 that the arm $r$ curves not only downwardly but laterally from the end of the offset $q'$ and is connected with the prong $r'$ by a reflexed curve, all of which curves cause the stirring-rod to traverse different parts of the dough and to mix the same in a very effective manner.

The reflexed curve which joins the arm $r$ and the prong $r'$ forms a loop which when the stirrer is rotated gathers the dough together and mixes it in a manner entirely different from the stirrers, which extend downward from the spindle in a simple vertical plane.

Figs. 1 and 9 show the prong $r'$ extended beneath the crank $s$ parallel with the same, so that the offset $q'$ is at right angles to the crank, which arrangement of the prong opposes the crank most effectively to the resistance of the dough to the stirrer; but the support of the spindle in the bearing enables the crank to rotate the stirrer in whatever position the crank be bent from the spindle.

The construction of my hand-crank $s$ and stirrer in one piece with the spindle $q$ necessitates the fitting of the bearing $l$ to the spindle before the rod is finally bent, and in order to separate the spindle from the bearing-bar to readily cleanse the same it necessitates a bearing-bar with a notch in the side and a bearing which can be secured upon the bar detachably. These features are cheaply provided in the structure shown in the drawings, and my invention is distinguished from previous constructions in this peculiarity of the bearing and of the bearing-bar.

Having thus set forth the nature of the invention, what is claimed herein is—

1. A dough-mixing apparatus comprising a stirrer with a crank for turning the same, a bearing-bar having a bearing for the stirrer, slides secured adjustably to opposite ends of the bearing-bar, and provided with means to engage the opposite ends of the bread-pan, and a clamp applied to one of such slides with means for attaching the clamp to the table.

2. A dough-mixing apparatus comprising a stirrer with a crank for turning the same, a bearing-bar having a bearing for the stirrer, slides secured adjustably to opposite ends of the bearing-bar, one of the slides having a hole near the end, and a bracket-clamp having adjustable means for attachment to the table, and a stud fitted to the hole in the slide.

3. A dough-mixing apparatus comprising a bearing-bar having a lateral notch $k$ for the passage of the spindle, a stirrer having a spindle with a bearing and adjusting-collar arranged permanently thereon, the stirrer projecting laterally from the spindle below the bearing and having a hand-crank projecting laterally above the bearing, means for securing the bearing detachably to the bearing-bar with the spindle in the notch, means upon the ends of the bearing-bar for securing it upon the pan, and the hand-crank serving to rotate the spindle and the stirrer.

4. A dough-mixing apparatus comprising the bearing-bar $a$ having the socket $i$ in the center with lateral opening $k$ extended therefrom through the side of the bar, the stirrer having a spindle $q$ with a bearing $l$ arranged permanently thereon, the stirrer projected laterally from the spindle below the bearing and a hand-crank projecting laterally from the spindle above the bearing, thus preventing its removal from the spindle, means for securing the bearing detachably in the socket $i$ with the spindle in the notch, and means upon the ends of the bearing-bar for securing it upon the pan.

5. A dough-mixing apparatus comprising the bearing-bar $a$ with a socket in the center, a bearing $l$ fitted detachably to the socket, the slides $c$ fitted adjustably to the opposite ends of the bearing-bar, a stirrer having a spindle fitted to slide vertically in the bearing with a collar for supporting the stirrer at different heights within the pan, and the spindle provided with a crank for rotating the stirrer.

6. A dough-mixing apparatus comprising the bearing-bar $a$ with a tapering socket in the center, the conical bearing $l$ fitted detachably to the socket, the slides $c$ fitted adjustably to the opposite ends of the bearing-bar, a stirrer having a spindle adjustable vertically in the bearing with a collar for supporting the stirrer at different heights within the pan, and the spindle having a crank for rotating the stirrer.

7. A dough-mixing apparatus comprising a bearing-bar with a socket in the center having lateral opening extended through the side of the bar, a bearing fitted detachably to the socket, slides fitted adjustably to the opposite ends of the bearing-bar, one of such slides provided with a lock to retain the bearing in the socket, and a stirrer having a spindle fitted to the socket with a crank for turning the same.

8. A dough-mixing apparatus comprising a bearing-bar having a socket in the center with lateral opening extended through the edge of the bearing-bar, a bearing fitted to the socket with a rib fitted to the opening and a notched lug extended below the bearing-bar, a slide fitted adjustably to one end of the bearing-bar and provided with a tongue to engage the notched lug, and a stirrer having a spindle fitted to the bearing and provided with a crank for turning the same.

9. A dough-mixing apparatus comprising a bearing-bar having the tapering socket $i$ in the center with an opening extended through the edge of the bearing-bar, the bearing $l$ fitted to the socket, a slide fitted adjustably to one end of the bearing-bar and provided with means for locking the bearing in the socket, a stirrer having a spindle movable vertically in the bearing and provided with a crank for turning the stirrer, and a collar adjustable upon the spindle above the bearing to support the stirrer at various heights below the bearing-bar.

10. A dough-mixing apparatus comprising a bearing-bar with a socket in the center having a lateral opening extended through the side of the bar, a bearing fitted detachably to the socket, slides fitted adjustably to the opposite ends of the bearing-bar with hooks upon their ends for engaging a flange upon the stirring-pan, one of such slides provided with a lock to retain the bearing in the socket, a stirrer having a spindle fitted to the socket with a crank for turning the same, and a lever having a lug and pivoted upon the under side of the bar to press the lug upon the inner wall of the pan, as and for the purpose set forth.

11. In a dough-mixer, a stirrer formed of one rod of metal, comprising the spindle $q$ with the hand-crank $s$ at the upper end and the offset $q'$ at the lower end of the spindle, with the bearing $l$ and adjustable collar $t$ fitted permanently to the spindle, between such crank and offset, the arm $r$ curved downwardly from the offset and the prong $r'$ reflexed from the arm at right angles to the spindle and at right angles from the offset, whereby the stirrer is bent in two distinct planes, and the prong $r'$ forms a loop at its junction with the arm $r$.

12. In a dough-mixer, a stirrer formed of one rod of metal, comprising the spindle $q$ with the hand-crank $s$ at its upper end and the offset $q'$ at right angles to the crank, with the bearing $l$ and adjustable collar $t$ fitted between the crank and offset, the arm $r$ curved downwardly and laterally from the offset, and the reflexed prong $r'$ extended at right angles to the spindle and at right angles to the offset and parallel with the crank, forming a loop at its junction with the arm $r$, and the stirrer thus being bent in two planes, as and for the purpose set forth.

In testimony whereof I have hereunto set my hand in the presence of two subscribing witnesses.

FREDERIC BARR.

Witnesses:
C. F. CONNER,
THOMAS S. CRANE.